(No Model.)
A. M. PIERCE.
PHOTOGRAPHIC PLATE HOLDER.
No. 484,569. Patented Oct. 18, 1892.
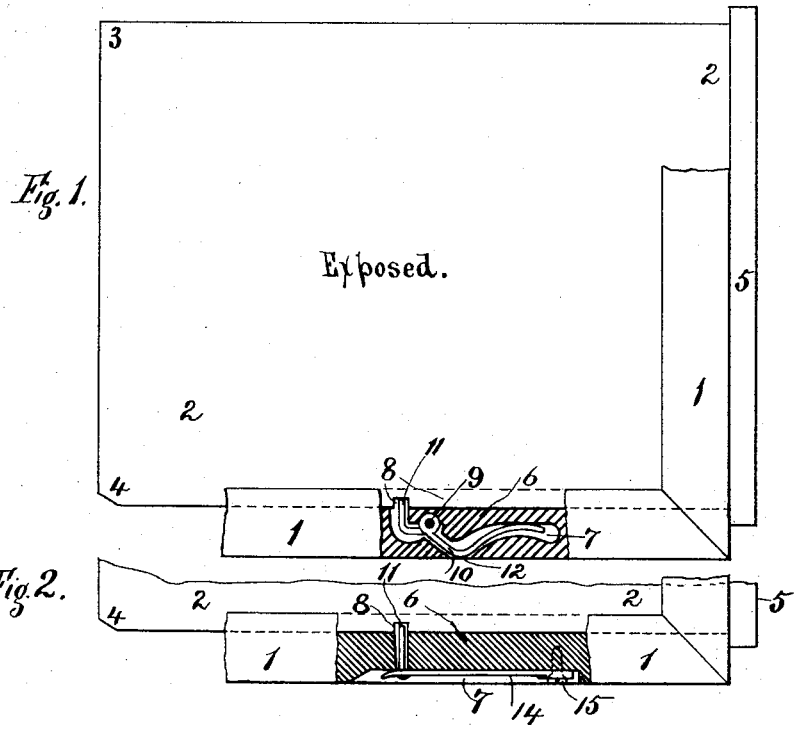
WITNESSES:-
W H Weightman
Isabel Chester.
INVENTOR:-
Arthur M. Pierce.

UNITED STATES PATENT OFFICE.

ARTHUR M. PIERCE, OF BROOKLYN, ASSIGNOR TO THE EASTMAN KODAK COMPANY, OF ROCHESTER, NEW YORK.

PHOTOGRAPHIC-PLATE HOLDER.

SPECIFICATION forming part of Letters Patent No. 484,569, dated October 18, 1892.

Application filed February 1, 1892. Serial No. 420,006. (No model.)

*To all whom it may concern:*

Be it known that I, ARTHUR M. PIERCE, a citizen of the United States, residing at Brooklyn, in the county of Kings and State of New York, have invented new and useful Improvements in Photographic-Plate Holders, of which the following is a specification.

My invention relates especially to frames employed for holding sensitized plates for use in connection with photographic cameras, and has for its object the provision of means whereby the exposure of the plate more than once will be effectually and automatically prevented.

To attain the desired end, my invention consists, essentially, in the combination, with a plate-holder and the slide thereof, of catch mechanism adapted and arranged to permit the slide to be withdrawn for the purpose of making an exposure, but which will prevent a second withdrawal of the slide after being returned to the holder while the holder is in position upon or in the camera, all of which will be hereinafter first fully described, and then pointed out in the claims.

In the accompanying drawings, Figure 1 shows a plan view of a portion of a photographic-plate holder embodying my invention, and Fig. 2 shows a modification.

1 is a plate-holding frame, either double or single, and made in the usual manner.

2 is a slide having one of its inner corners square, as at 3, and the other corner beveled or cut off, as at 4. At 8 the slide is notched, for the purpose hereinafter set forth. This slide is perforatably marked upon one side "Exposed."

5 is a hand-piece for manipulating the slide 2. The side of the frame at 6 is shown as having a portion of the outer wall removed and a cavity 7 formed in the body of the material of the frame. Upon a pivot 9 within this cavity is placed a catch-piece 10, the nose 11 whereof is arranged to enter the notch 8 in the slide 2, and the portion of the catch-piece at the opposite side of the pivot is curved, so as to extend substantially to a line with the outer face of the frame 1, and then is curved inward, resting against the wall of the cavity 7 in such a manner as to normally force the nose 11 into the notch 8. At 12 the side of the frame 1 is cut away, so as to expose the catch-piece.

When constructed and arranged in accordance with the foregoing description, the operation of my device is as follows: The sensitized plates are put into the holder in a dark room in the usual manner and the slide is pushed into place with the word "Exposed" upon the inside, the catch-piece being forced out of the groove in which the slide runs by pressing upon the exposed portion at the side of the holder with the thumb or thumb-nail, thus permitting the square corner 3 to pass thereby. The holder being now placed in the camera, the slide is withdrawn for making the exposure in the usual manner. As the slide is withdrawn the catch-piece returns to its normal position, projecting into the groove forming the slideway. If now an attempt is made to return the slide to its initial position, the corner 3 will come in contact with the nose of the catch-piece and its further inward movement will be stopped. This compels the operator to withdraw the slide and reverse it with the word "Exposed" out. He may now push the slide into place, the bevel 4 automatically throwing the nose of the catch out of the slideway, and when the slide is pushed home the nose of the catch-piece will enter the notch 8, preventing any possible movement of the slide until the holder is removed from the camera and the catch released. It will thus be seen that my invention compels the operator to reverse the slide, and when thus reversed and fully closed it is locked in place against the possibility of movement, thus automatically preventing more than one exposure of the plate.

In the modification shown in Fig. 2, 14 is a spring-piece held in place by a screw or equivalent at 15 and having an inwardly-projecting nose-piece 11. In order to withdraw the catch, it is only necessary to pass the nail beneath the free end of the spring-piece 15.

Having now fully described my invention, what I claim as new therein, and desire to secure by Letters Patent, is—

1. The combination, with a plate-holder having a movable stop in the path of the slide, of a reversible slide having an abutting shoulder and an incline, one or the other of which is in line with said stop when the slide is inserted into the holder, whereby the slide will pass in one position and in the reversed position be arrested by said stop, substantially as set forth.

2. The combination, with a plate-holder having a movable stop in the path of the slide, of a reversible slide having an abutting shoulder and an incline, one or the other of which is in line with said stop when the slide is inserted into the holder, whereby the slide will pass in one position and in the reversed position be arrested by said stop, the slide being also provided with a locking shoulder or notch whereby it may be retained in the holder, substantially as set forth.

3. A photographic-plate holder, in which is comprised an inclosing frame provided with a catch at one side, the nose whereof projects into the slideway in said frame, and a slide having one of its inner corners square and the other cut away, said slide being also provided with a notch in one edge, the whole combined and arranged substantially as shown and described.

ARTHUR M. PIERCE.

Witnesses:
  ISABEL CHESTER,
  WM. H. WEIGHTMAN.